Dec. 17, 1929.                A. B. LUND                1,740,256
                               COW POKE
                           Filed July 15, 1929
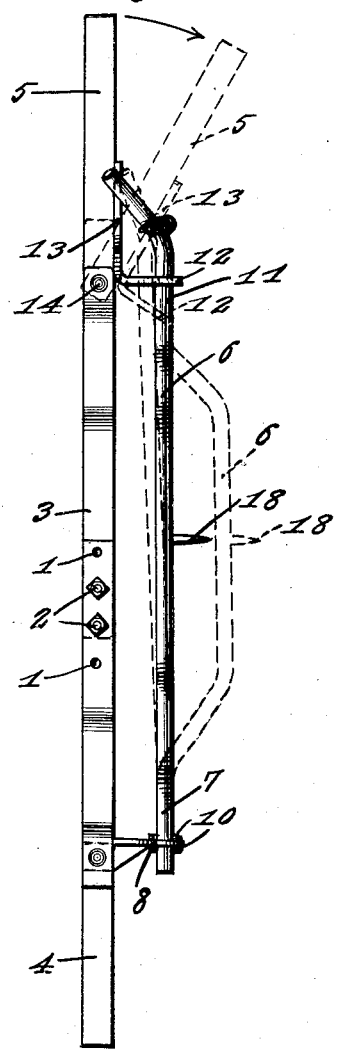
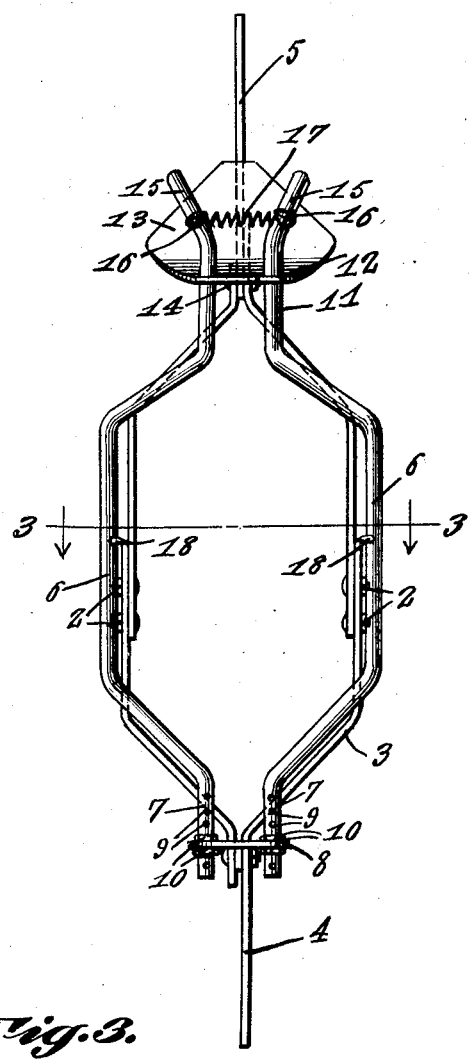
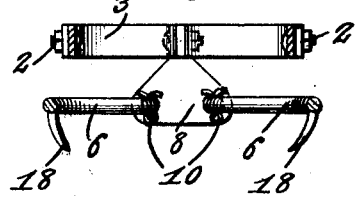
A. B. Lund, INVENTOR
BY Victor J. Evans
ATTORNEY Patented Dec. 17, 1929

1,740,256

UNITED STATES PATENT OFFICE

ALVIN BENHART LUND, OF CLAREMONT, SOUTH DAKOTA

COW POKE

Application filed July 15, 1929. Serial No. 378,373.

My present invention has reference to animal pokes and consists in the novel construction and arrangement of parts hereinafter shown and described.

The object of the invention is to provide a poke that includes an adjustable yoke to be arranged upon the neck of an animal and which has one of its ends formed with a projection in the nature of a finger and its second end provided with a pivoted finger, which latter is designed, when brought into contact with an obstacle to influence an element through which there is journaled the upper or straight arms of substantially U-shaped bars which comprise the poke proper, the said bars having attached thereto impinging elements which will be thus brought into engagement with the neck of the animal, subjecting the said animal to discomfort and pain which will cause it to desist in its attempt to project its head through the fence or gate or to get over or under the same, while spring means normally hold the poke and the prongs thereon away from and out of engagement with the neck of the animal.

To the attainment of the foregoing the invention consists in the improvement hereinafter described and definitely claimed.

In the drawings:

Figure 1 is a side elevation of the improvement.

Figure 2 is a rear elevation thereof.

Figure 3 is a sectional view approximately on the line 3—3 of Figure 2.

As disclosed by the drawings my improvement contemplates the employment of a yoke that is designed to be arranged over the neck of an animal. The yoke is constructed of two sections and has lapping sides or arms provided with a plurality of spaced apertures 1, certain of which are designed to receive therethrough securing means 2, whereby the sections of the yoke 3 are adjustably connected.

One of the members of the sectional yoke, at the lower and inclined portion thereof, is formed with an extension in the nature of a finger 4 and the second or upper inwardly inclined ends of the yoke have pivoted therebetween an upwardly directed finger 5.

The poke proper comprises two substantially U-shaped rods, each of which is similarly constructed and, therefore, each indicated by the numeral 6. The inwardly inclined lower ends of the rods 6 merge into straight extensions 7 and the said extensions pass through suitable openings in a plate 8 that is bolted or otherwise fixedly secured to the lower end of the yoke. The ends 7 of the poke arms are provided with series of apertures 9 which have passed therethrough upper and lower cotter pins 10—10 which contact with the opposite faces of the plate 8 and thereby hold the poke rods adjusted on the yoke.

The upper inwardly inclined ends of the rods 6 merge into straight extensions or arms 11 that pass through spaced openings in the horizontal flange 12 of an angle plate 13 which is centrally fixed to the finger 5, and thereby is swingable with the said finger on the pivot connection 14 between the finger and the upper ends of the yoke.

The extremities of the arms 11 are inclined away from each other, as at 15, and passing through these ends there are suitable eye members which are preferably the eyes of cotter pins 16, and secured in these eyes there are the ends of a coil spring 17. The eyes are arranged adjacent to the angle plate 13 and, therefore, the spring exerts a tension to swing the poke arms to the position disclosed by figure 2 of the drawings and consequently the said arms are normally held housed from contact with the neck of the animal. The straight and parallel central portions of the poke arm 6 are disposed outwardly with respect to the straight side members of the yoke 3 and the inner faces of the arms 6 have secured thereto inwardly directed prongs 18.

It will be apparent that the poke may be worn by the animal with perfect safety as long as the animal does not attempt to pass between the strands of fences, gates or the like. In such event the obstruction is met by the fingers 4 and 5. The finger 4 serves as a retarding element but the obstruction contacting with the finger 5 will cause the same to be swung with the angle plate 13 to the dotted line position illustrated by Figure 1 of the drawings and the swinging of the angle plate 13 will cause the arms 11 of the poke members 6 to swing to the said dotted line position and thereby bring the prongs 18 into impinging engagement with the sides of the neck of the animal. This, of course, will cause the animal to desist from such attempts. The spring 17 will, of course, return the poke arms to initial position after pressure on the finger 5 is removed. The yoke as stated comprises adjustable sections and by forming the lower arms or extensions 7 of the poke members 6 with the apertures 9 it will be noted that these arms may be adjusted vertically on the yoke.

Having described the invention, I claim:

1. An animal poke comprising a yoke designed to be arranged over the neck of an animal, said poke having a lower extension, a plate above said extension and a finger pivotally secured to the upper end of the yoke, an angle plate fixed on the inner face of the finger, a poke comprising two substantially U-shaped rods having straight ends, the lower ends being journaled through openings in the plate, the upper ends passing through openings in the horizontal flange of the angle plate, spring means connecting the upper arms for holding the same against the vertical flange of the plate and the parallel central and straight arms of the poke rods having inwardly directed prongs thereon.

2. An animal poke comprising a yoke constructed of two adjustably associated sections, said yoke having a lower extending arm and an inwardly projecting laterally arranged plate above said arm, a finger pivotally secured to the upper end of the yoke and having an angle plate fixed on the inner face thereof, poke arms which are substantially U-shaped in plan and which have their ends formed with straight extensions, the lower extensions being provided with a series of apertures and passing through the lower plate of the yoke, cotter pins passing through the apertures and contacting with the upper and lower faces of the plate, the upper arms extending through bearing openings in the horizontal flange of the angle plate and the ends of these arms being arranged at outward angles with respect to each other, spring means connecting said ends for causing the poke arms to lie in parallelism with the yoke and the straight central and parallel parts of the poke arms being provided with inwardly projecting prongs.

In testimony whereof I affix my signature.

ALVIN BENHART LUND.